July 10, 1956 M. H. PARKS Re. 24,180

FOUNDATION FOR USE WITH SOFT SURFACE FORMATION

Original Filed May 25, 1948 2 Sheets-Sheet 1

INVENTOR.
Mercer H. Parks,
BY
Hermon B. Wheeler
ATTORNEY.

FOUNDATION FOR USE WITH SOFT SURFACE FORMATION

Original Filed May 25, 1948 2 Sheets-Sheet 2

INVENTOR.
Mercer H. Parks,
BY
Thomas B. McBride
ATTORNEY.

United States Patent Office

Re. 24,180
Reissued July 10, 1956

24,180

FOUNDATION FOR USE WITH SOFT SURFACE FORMATION

Mercer H. Parks, Harris County, Tex., assignor, by mesne assignments, to Esso Research and Engineering Company, a corporation of Delaware Original No. 2,607,198, dated August 19, 1952, Serial No. 29,035, May 25, 1948. Application for reissue June 14, 1954, Serial No. 436,755

5 Claims. (Cl. 61—46)

Matter enclosed in heavy brackets [ ] appears in the original patent but forms no part of this reissue specification; matter printed in italics indicates the additions made by reissue.

The present invention is concerned with an improved apparatus and method for conducting well drilling operations in marine locations or in locations wherein semi-fluid soil or mud is found. The invention is more particularly directed to improved equipment and the method for installing, reinforcing and strengthening a foundation in soil of such consistency that regular excavation is impractical or impossible. In accordance with a specific adaptation of the present invention an improved apparatus is utilized for marine operations, particularly in the recovery of fluids such as petroleum oils and gases from such locations.

It is well known in the art to utilize various equipment and methods for recovering fluids from subterranean areas located beneath marine locations or in swamp areas. In general, the method employed is to install an overhead platform on a suitable foundation positioned in these marine locations. The platform contains the drilling rig, pumps, tubing handling and other necessary recovery equipment. However, in certain areas, particularly in areas where semi-fluid or inconsistent soil exists above the bearing strata, difficulty is encountered in firmly positioning the foundation. The greater the area or depth of the semi-fluid above the bearing strata the more difficulty is encountered.

In accordance with the present invention it is possible to better and more firmly place the foundation elements. The apparatus comprises a movable pontoon element employed in conjunction with a hollow column element and accompanying elements. The present invention may be readily understood by reference to the drawings illustrating embodiments of the same.

Fig. 3 illustrates the apparatus seated firmly in the bearing strata; while

The figures will be described in conjunction with the method of operation.

Figure 1:
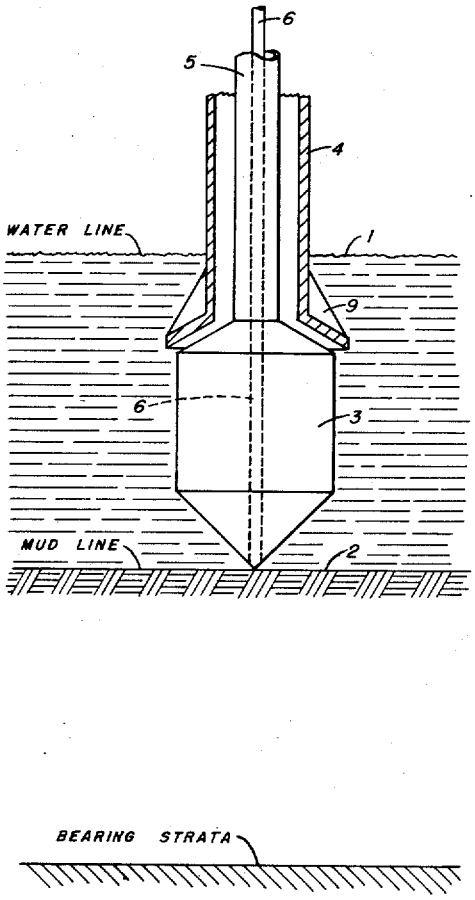
Fig. 1 illustrates the invention wherein the apparatus has reached the mud line.

Referring specifically to Fig. 1, the entire apparatus is transported by any suitable means to the location wherein it is desired to position the pontoon. The apparatus is placed beneath water line 1 on the mud or semi-fluid line 2. The apparatus comprises a pontoon element 3 having the cross-sectional area necessary to carry a predetermined load in a competent or semi-competent strata below the mud line. A column element 5 is attached to the top of pontoon 3. Pontoon element 3 is tapered to form a downwardly, pointing wedge to facilitate penetration of the semi-fluid formation. Furthermore, the top of element 3 is formed to be part of the shoulders of an upward pointing wedge. The lower area of a conduit 4, concentrically disposed about element 5, is flared to form a seating surface on the sloping top of pontoon 3, as described. The apparatus also contains a pipe member 6 disposed within column 5, extending to the bottom and through pontoon element 3. In operation, water or other suitable fluid is pumped down through pipe 6 and injected at the bottom of pontoon element 3 into the mud thus exerting a drilling and washing force, thus enabling pontoon element 3 to sink more readily into the semi-fluid area. The pontoon is lowered by filling the area within the pontoon with any suitable fluid, such as sea water, or solid material such as sand, gravel and the like.

Figure 2:
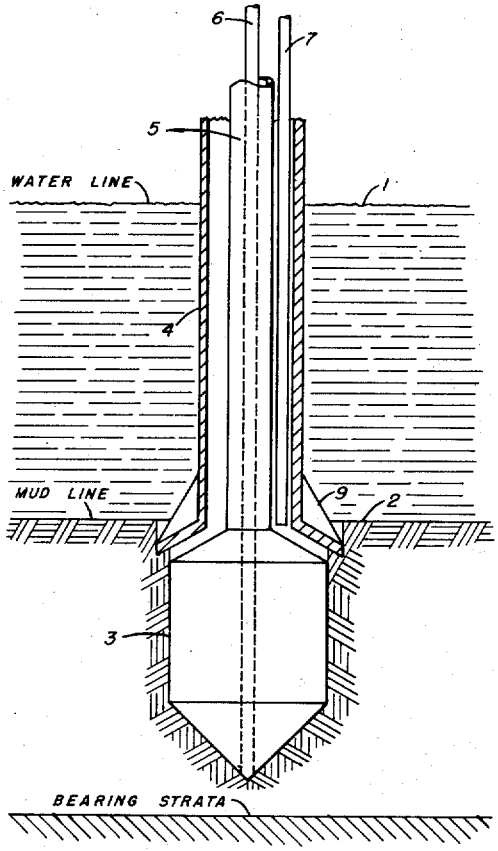
Fig. 2 illustrates the apparatus positioned just above the bearing strata.

Referring specifically to Fig. 2, the apparatus is illustrated as it pierces the mud or semi-fluid area. Similar numbers are utilized in Fig. 2 to illustrate similar parts referred to in Fig. 1. At this point in the operation of the apparatus the conduit 4 is held in a stationary position as the pontoon element descends through the mud area. Simultaneously as pontoon 3 moves vertically downwardly, graded sand and gravel are introduced at the top of the opening between column 5 and conduit 4 at a measured rate to fill the space left between the top of pontoon 3 and the seat on the bottom of conduit 4. Under certain conditions it may be desirable to assist the movement of this sand and gravel through the space between the column and the conduit by injecting water or other suitable fluid through a plurality of pipes 7.

Figure 3:
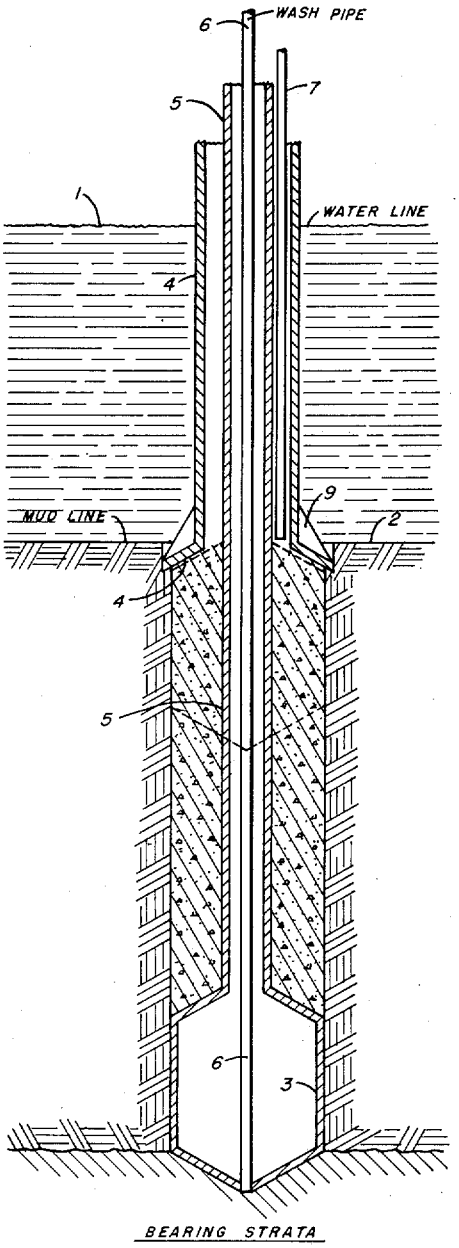

Referring specifically to Fig. 3, the apparatus is shown positioned at the bottom of an incompetent area and seated firmly on the bearing strata. Pontoon element 3 is positioned on the bearing strata as shown. The area between the conduit 4 and the top of the pontoon 3 is filled with a suitable material which for the purpose of illustration is taken to be sand and gravel.

Figure 4:
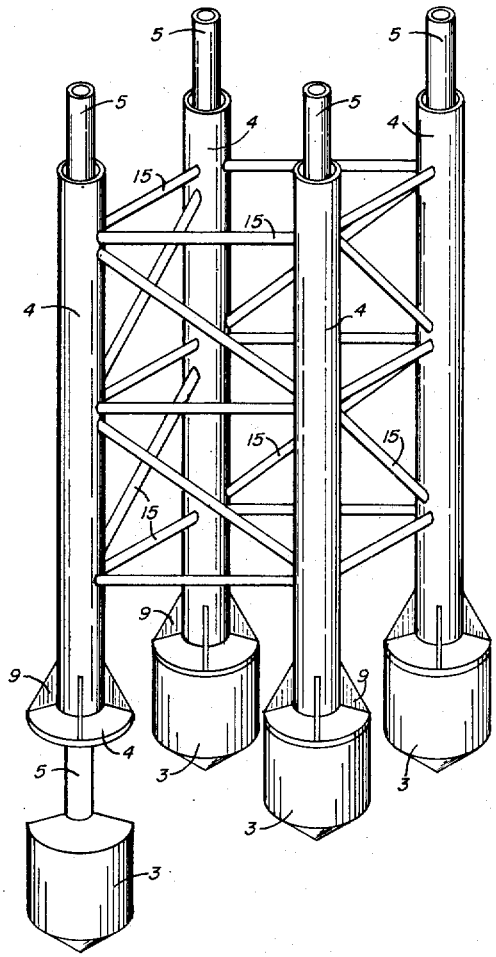
Fig. 4 illustrates the apparatus employed in multiple units.

Fig. 4 illustrates the invention wherein a multiplicity of the present units are utilized. The method and operation is identical when employing several units as when operating one. Similar numbers are used to designate similar elements referred to in the preceding figures. Pontoon elements 3 are shown having the tapered top and bottom. Casing elements 4 are likewise illustrated having a tapered seat 9 which seats on the top of tapered pontoon elements 3. Column elements 5 communicating with pontoon elements 3 are likewise shown. In accordance with this adaptation of the invention the similar apparatus elements are firmly connected one with the other by suitable bracing means 15.

The invention is directed toward an improved apparatus and method for firmly positioning foundation elements in semi-fluid or inconsistent soil. The idea generally embraces the employment of equipment and the method for installing said equipment and strengthening the same in soil having characteristics that regular positioning of equipment is relatively difficult or in many cases impossible. It is within the concept of the present invention to take advantage of the buoyant qualities of semi-fluid soil and utilize it in combination with its shearing or adhesive qualities to support the foundation and its useful loads. The dimensions of the various elements will vary appreciably depending upon the characteristics of the semi-fluid soil itself and the load to be supported. As pointed out, the apparatus may be used singly or in any desirable multiples and framed together by necessary members either on location or *preformed* [performed] and carried to the location as a unit.

As discussed above, one method of installation is to transport the assembled apparatus in units or multiples and to set up these units in a vertical position. The bottom of the pontoon is allowed to rest while empty or relatively empty on the uppermost of the semi-fluid strata. [The conduit is then supported to prevent its moving laterally or vertically.] Water or other suitable material either fluid or solid is introduced through the column into the pontoon thus weighing it down and exerting its thrust downwardly through the semi-fluid soil. Under certain conditions it is desirable to pass water downwardly through the column and through the pontoon by suitable means and to eject this water from the bottom of the pontoon thus aiding the pontoon in its progress through the semi-fluid soil.

As the pontoon moves downwardly a suitable filling material which may be any desired material is passed downwardly between the column and the conduit into the space between the top of the pontoon and the lower lip of the conduit. In order to assist the movement of this solid material into the area between the lower lip of the conduit and the top of the pontoon which is produced by the lowering of the pontoon into the semi-fluid soil, water or other suitable fluid may be employed.

It is within the scope of the present invention to employ mechanical vibration of the columns or other elements to assist the semi-gravel mix to move into the space between the conduit and the pontoon.

During the sinking of the pontoon and the column element it may be necessary to apply additional loading at the top of the column and the application of such weight will constitute the first test of the foundation. When the pontoon supporting the column has been thus loaded to the predetermined value and has penetrated to a competent bearing strata or suspended in the semi-fluid strata by buoying and/or friction and/or adhering qualities the column is surrounded by a continuous ring of sand and gravel introduced as hereinbefore described. Thus the semi-fluid strata is held back from contact with the column. At this point of the operation the column is reinforced longitudinally by the sand bed. The circumference of the friction area with the surrounding strata is increased in the ratio of the pontoon diameter to the column diameter. Under certain circumstances it may be necessary to further increase the capacity of the column and the foundation as a whole.

It is within the concept of the present invention to employ cement between the top of the pontoon 3 and the bottom of the conduit. Any suitable means of positioning this cement may be utilized. For example, it is within the concept of the present invention to position the cement and gravel as described and then to perforate the column and to pass or squeeze cement slurry out through the holes in the column to impregnate the surrounding sand and gravel, thus causing the column to be encased in concrete from top to bottom. This still further reinforces the column laterally to where it can be more fully developed in compression and consolidates the sand and gravel to the extent that any additional friction set up around the periphery will be effective in supporting the load on the top of the column. It is within the scope of the present invention to install any desirable framework necessary to support the load on the column as positioned.

In the installation of a multiple foundation as illustrated in Fig. 4 the conduits would be attached one to another and spaced as desired by suitable framing to hold them together. Means are utilized to support them in a vertical position so that there would be relatively little movement between them. The pontoon elements and columns may be prefabricated in the structure as illustrated heretofore. In moving the unit to the location it is desirable that the pontoon elements be of sufficient size so that the structure can be floated to its position. After towing the structure or assembly to the desired position one or more of the pontoons are lowered as described.

Having described the invention, it is claimed:

1. Improved foundation apparatus for positioning in semi-fluid soil which comprises a hollow, cylindrical pontoon element having substantially conical sloped end surfaces, a cylindrical hollow column element of smaller diameter than said pontoon element attached to the upper end of said pontoon and communicating therethrough with the interior of said element, a cylindrical casing element coaxial with said hollow column, said casing element having an outwardly flared lower end adapted to seat against the upper end of said pontoon element and disposed in annularly spaced relation to said column element.

2. Apparatus as defined by claim 1 wherein means are disposed in the area between said column element and said casing element for introducing semi-fluid cementitious materials.

3. Apparatus as defined by claim 1 wherein pipe means are disposed within said column element extending downwardly to the bottom of said pontoon element and opening therethrough.

*4. Apparatus for well drilling operations which comprises, in combination, a plurality of cylindrical pontoon elements, a plurality of column elements of smaller diameter than the pontoon elements each connected to the upper end of one of said pontoon elements, a plurality of conduit elements each coaxially disposed in annularly spaced relationship on one of said column elements, means interconnecting said conduit elements in spaced apart relationship to form a multiple structure and to maintain said pontoon elements in an upright position, and means for submerging each of said pontoon elements to the underlying land bottom of a water location, said pontoon elements having a greater periphery than the conduit elements such that the conduit elements are seated on and supported, on their lower ends, by the upper ends of the pontoon elements.*

*5. Apparatus for well drilling operations which comprises, in combination, a plurality of cylindrical pontoon elements, a plurality of column elements of smaller diameter than the pontoon elements each connected to the upper end of one of said pontoon elements, a plurality of conduit elements each coaxially disposed in annularly spaced relationship on one of said column elements, means interconnecting said conduit elements in spaced apart relationship to form a multiple structure and to maintain said pontoon elements in an upright position, means for submerging each of said pontoon elements to the underlying land bottom of a water location, and reinforcing means surrounding said column elements arranged between the top of the pontoon elements and the bottom of the conduit elements for firmly embedding said pontoon elements on said land bottom, said pontoon elements having a greater periphery than the conduit elements such that the conduit elements are seated on and supported, on their lower ends, by the upper ends of the pontoon elements.*

References Cited in the file of this patent or the original patent

UNITED STATES PATENTS

| | | |
|---|---|---|
| 480,127 | O'Rourke | Aug. 2, 1892 |
| 1,718,006 | Reno | June 18, 1929 |
| 1,892,125 | Armstrong | Dec. 27, 1932 |
| 2,248,051 | Armstrong | July 8, 1941 |
| 2,381,014 | Thornley | Aug. 7, 1945 |
| 2,528,089 | Siecke et al. | Oct. 31, 1950 |
| 2,580,911 | Harris | Jan. 1, 1952 |

FOREIGN PATENTS

| | | |
|---|---|---|
| 816,498 | France | 1937 |